US011710040B2

(12) United States Patent
Farivar et al.

(10) Patent No.: US 11,710,040 B2
(45) Date of Patent: Jul. 25, 2023

(54) GENERATING SYNTHETIC MODELS OR VIRTUAL OBJECTS FOR TRAINING A DEEP LEARNING NETWORK

(71) Applicant: Capital One Services, LLC, McLean, VA (US)

(72) Inventors: Reza Farivar, Champaign, IL (US); Kenneth Taylor, Champaign, IL (US); Austin Walters, Savoy, IL (US); Joseph Ford, III, Manakin-Sabot, VA (US); Rittika Adhikari, Westford, MA (US)

(73) Assignee: Capital One Services, LLC, McLean, VA (US)

( * ) Notice: Subject to any disclaimer, the term of this patent is extended or adjusted under 35 U.S.C. 154(b) by 56 days.

(21) Appl. No.: 17/305,256

(22) Filed: Jul. 2, 2021

(65) Prior Publication Data
US 2021/0397898 A1    Dec. 23, 2021

Related U.S. Application Data

(63) Continuation of application No. 16/541,406, filed on Aug. 15, 2019, now Pat. No. 11,055,573, which is a (Continued)

(51) Int. Cl.
*G06N 3/08*    (2023.01)
*G06F 18/21*    (2023.01)
(Continued)

(52) U.S. Cl.
CPC ............ *G06N 3/08* (2013.01); *G06F 18/214* (2023.01); *G06F 18/217* (2023.01);
(Continued)

(58) Field of Classification Search
CPC .. G06K 9/6262; G06K 9/6256; G06K 9/6273; G06K 9/00375; G06N 3/08
See application file for complete search history.

(56) References Cited

U.S. PATENT DOCUMENTS 10,430,692 B1    10/2019    Farivar et al.
11,055,573 B2    7/2021    Farivar et al.
(Continued)

OTHER PUBLICATIONS

Buchholz et al., "An Ellipsoidal Representation of Human Hand Anthropometry", Human Factors, 1991,33(4),429-441 (Year: 1991).*
(Continued)

*Primary Examiner* — Qian Yang
(74) *Attorney, Agent, or Firm* — Harrity & Harrity, LLP

(57) ABSTRACT

In some implementations, a training platform may receive data for generating synthetic models of a body part, such as a hand. The data may include information relating to a plurality of potential poses of the hand. The training platform may generate a set of synthetic models of the hand based on the information, where each synthetic model, in the set of synthetic models, representing a respective pose of the plurality of potential poses. The training platform may derive an additional set of synthetic models based on the set of synthetic models by performing one or more processing operations with respect to at least one synthetic model in the set of synthetic models, and causing the set of synthetic models and the additional set of synthetic models to be provided to a deep learning network to train the deep learning network to perform image segmentation, object recognition, or motion recognition.

20 Claims, 7 Drawing Sheets

Related U.S. Application Data continuation of application No. 16/250,719, filed on Jan. 17, 2019, now Pat. No. 10,430,692.

(51) Int. Cl.
  *G06F 18/214*  (2023.01)
  *G06V 10/764*  (2022.01)
  *G06V 10/774*  (2022.01)
  *G06V 10/82*   (2022.01)
  *G06V 40/10*   (2022.01)

(52) U.S. Cl.
  CPC .......... *G06V 10/764* (2022.01); *G06V 10/774* (2022.01); *G06V 10/82* (2022.01); *G06V 40/107* (2022.01)

(56) References Cited

U.S. PATENT DOCUMENTS

| | | |
|---|---|---|
| 2012/0117514 A1 | 5/2012 | Kim et al. |
| 2017/0168586 A1 | 6/2017 | Sinha et al. |
| 2018/0268255 A1 | 9/2018 | Surazhsky et al. |

OTHER PUBLICATIONS

Aristidou, Andreas, "Hand Tracking With Physiological Constraints," The Visual Computer, Oct. 11, 2016, 16 pages.

Extended European Search Report for Application No. EP20152426. 1, dated Jun. 5, 2020, 9 pages.

Lindgren K., et al., "Learned Hand Gesture Classification Through Synthetically Generated Training Samples", IEEE, RSJ International Conference on Intelligent Robots and Systems (IROS), Oct. 2018, pp. 3937-3942, XP033490777.

Mayer N., et al., "What Makes Good Synthetic Training Data for Learning Disparity and Optical Flow Estimation?," International Journal of Computer Vision, Mar. 2018, 24 pages.

Simonite T., "Some Startups use Fake Data to Train AI," Apr. 25, 2018, 19 pages. Retrieved from Internet:[URL: https://www.wired.com/story/some-startups-use-fake-data-to-train-ai/].

Tsai C-J., et al., "Synthetic Training of Deep CNN for 3D Hand Gesture Identification", International Conference on Control, Artificial Intelligence, Robotics & Optimization (ICCAIRO) IEEE, May 20, 2017, pp. 165-170, XP033296502.

Varol G., et al., "Learning from Synthetic Humans", arxiv.org, Cornell University, Jan. 5, 2017, 10 pages, XP081305231.

\* cited by examiner

US 11,710,040 B2

GENERATING SYNTHETIC MODELS OR VIRTUAL OBJECTS FOR TRAINING A DEEP LEARNING NETWORK

RELATED APPLICATION

This application is a continuation of U.S. patent application Ser. No. 16/541,406, filed Aug. 15, 2019 (now U.S. Pat. No. 11,055,573), which is a continuation of U.S. patent application Ser. No. 16/250,719, filed Jan. 17, 2019 (now U.S. Pat. No. 10,430,692), the contents of which are incorporated herein by reference in their entireties.

BACKGROUND

A neural network, such as a deep learning network, can be trained to progressively improve performance on a specific task. For example, in computer vision, a deep learning network may be trained to identify objects in images using a supervised (e.g., classification) approach, where training images (along with labels that identify objects of interest in the training images) are progressively fed into the network over time.

SUMMARY

According to some implementations, a method may include receiving, by a training platform, data for generating synthetic models of a body part, the body part including a hand, and the data including information relating to a plurality of potential poses of the hand; generating, by the training platform, a set of synthetic models of the hand based on the information, each synthetic model, in the set of synthetic models, representing a respective pose of the plurality of potential poses; deriving, by the training platform and after generating the set of synthetic models, an additional set of synthetic models based on the set of synthetic models, the deriving including: performing one or more processing operations with respect to at least one synthetic model in the set of synthetic models; and causing, by the training platform, the set of synthetic models and the additional set of synthetic models to be provided to a deep learning network to train the deep learning network to perform image segmentation, object recognition, or motion recognition.

According to some implementations, a device may include one or more memories and one or more processors communicatively coupled to the one or more memories, configured to: receive data for generating synthetic models of a hand, the data including information relating to a plurality of potential poses of the hand; generate a set of synthetic models of the hand based on the information, each synthetic model, in the set of synthetic models, representing a respective pose of the plurality of potential poses; derive, after generating the set of synthetic models, an additional set of synthetic models based on the set of synthetic models, wherein the one or more processors, when deriving the additional set of synthetic models, are configured to: determine one or more adjustments to one or more synthetic models in the set of synthetic models, and generate the additional set of synthetic models based on the one or more adjustments; and provide the set of synthetic models and the additional set of synthetic models to a deep learning network to train the deep learning network to perform image segmentation, object recognition, or motion recognition.

According to some implementations, a non-transitory computer-readable medium may include one or more instructions that, when executed by one or more processors of a device, cause the one or more processors to: receive data for generating synthetic models of a body part, the data including information relating to a plurality of potential poses of the body part; derive a first set of synthetic models of the body part based on the information, each synthetic model, in the first set of synthetic models, representing a respective pose of the plurality of potential poses of the body part; perform, after deriving the first set of synthetic models, an action with respect to each synthetic model, in the first set of synthetic models, to generate a second set of synthetic models; and provide at least a portion of the first set of synthetic models and the second set of synthetic models to a neural network to train the neural network to perform image segmentation, object recognition, or motion recognition.

DETAILED DESCRIPTION

Figure 1A:
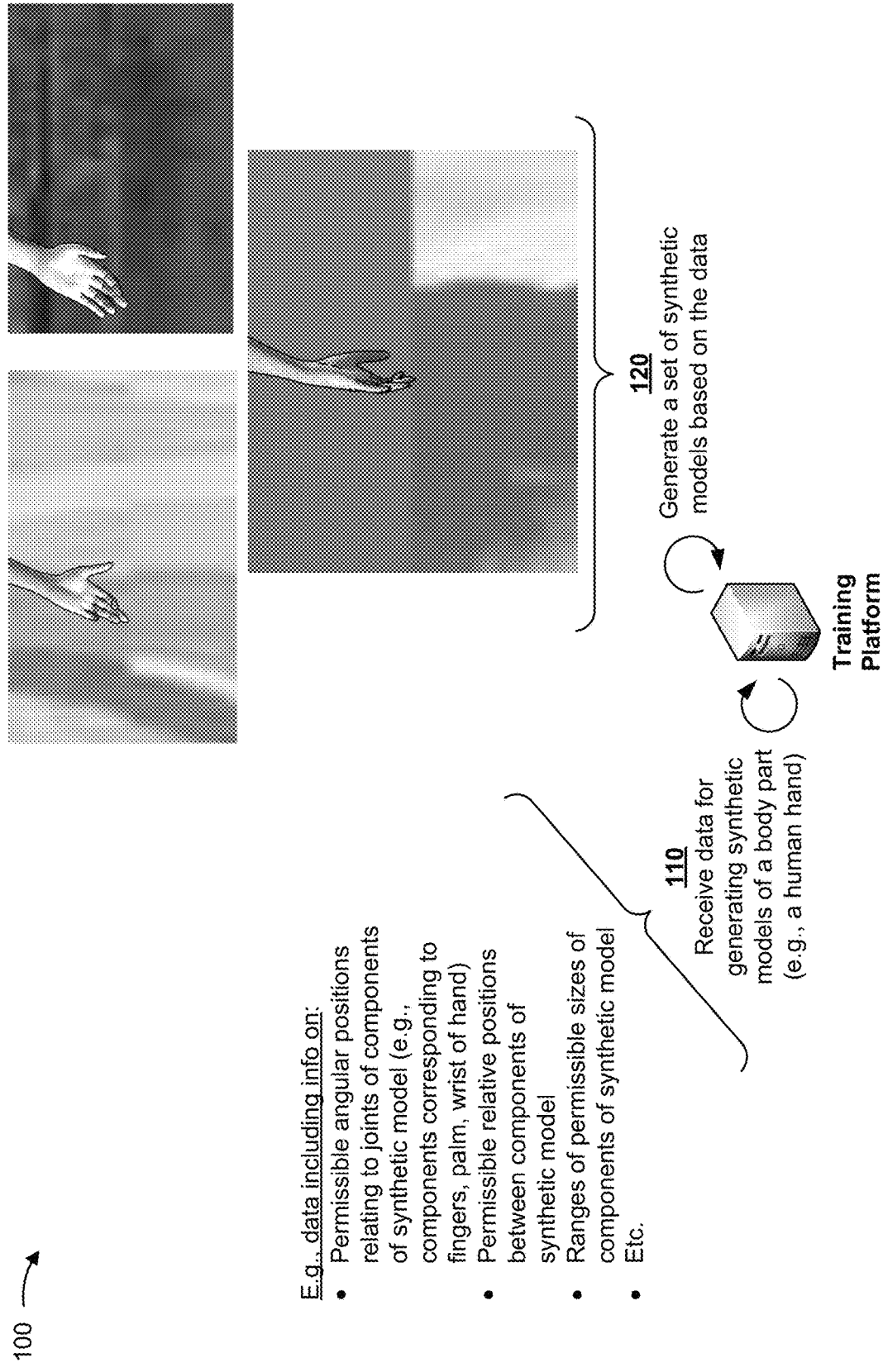
FIGS. 1A and 1B are diagrams of an example implementation described herein.

The following detailed description of example implementations refers to the accompanying drawings. The same reference numbers in different drawings may identify the same or similar elements.

Training a deep learning network is data-intensive. For example, in computer vision, a deep learning network may need to consume thousands, tens of thousands, hundreds of thousands, or more training images and corresponding labels before a satisfactory level of performance is achieved. It is also labor-intensive to generate labels for large volumes of training images, and in some cases, there is often a shortage of training images in the first place. It is also especially challenging to train a deep learning network to recognize certain three-dimensional (3D) objects that have multiple moving parts. The human hand, for example, can bend and rotate relative to a wrist, and includes multiple fingers, each having multiple joints that permit different portions of each finger to bend at different angles. For example, the human hand can be arranged in a variety of poses, ranging from fully open and flat pose to a closed fist, and appear differently in different fields of view. This makes it difficult, and time-consuming, to prepare training images of hands, and corresponding labels for the training images, that are sufficient to properly train a deep learning network.

Some implementations described herein provide a training platform that is capable of generating synthetic models (e.g., sometimes referred to as virtual objects) of body parts, such as the human hand. In some implementations, a synthetic model may include components that correspond to various parts of a human hand, such as individual components that correspond to fingers, a wrist, a palm, and/or the like of the human hand (along with joints that correspond to the various joints of the human hand). In some implementations, the training platform may be configured to receive data relating to potential poses of a human hand, and utilize the data to generate multiple synthetic models of the human hand. In some implementations, the data may include information that identifies ranges of permissible angular positions relating to the joints associated with components of a synthetic model, ranges of permissible distances between the components, ranges of permissible sizes of the components, and/or the like. In some implementations, the training platform may be configured to randomly, or pseudo-randomly, generate multiple synthetic models that each conforms to such permissible ranges, and thus represent a wide variety of poses of the human hand that are realistic and/or that conform to the natural anatomical limits of the human hand. In some implementations, the training platform may be configured to derive additional synthetic models based on the generated synthetic models (e.g., such as by using different backgrounds for the generated synthetic models), to arrive at a large set of synthetic models, and provide the set of synthetic models (along with accurate labels) to a deep learning network to train the deep learning network to perform image segmentation, object recognition, motion recognition, and/or the like.

In this way, the training platform generates high-quality synthetic models (e.g., virtual objects) that are sufficiently realistic to accurately train a deep learning network to recognize images of actual human hands and/or particular motions or activities of a human hand. This reduces or eliminates a need to capture actual images of human hands, and curating the images to label the human hands, which is an otherwise time-consuming and error-prone process. Generating synthetic models, with precise labels of what a deep learning network is to learn to identify, and utilizing such synthetic models to train a deep learning network, as described herein, improves the overall learning process of the deep learning network, thus conserving processing resources and memory resources that would otherwise need to be expended by the deep learning network to process inaccurate training data. Further, the deep learning network can be used to perform segmentation of images in a variety of fields involving human hands, such as in medical diagnoses (e.g., to determine whether a patient has a hand-related medical condition and/or the like), hand-based robotics (e.g., where precise detection and monitoring of a hand may be translated into robotic motion), and/or the like.

Figure 1B:
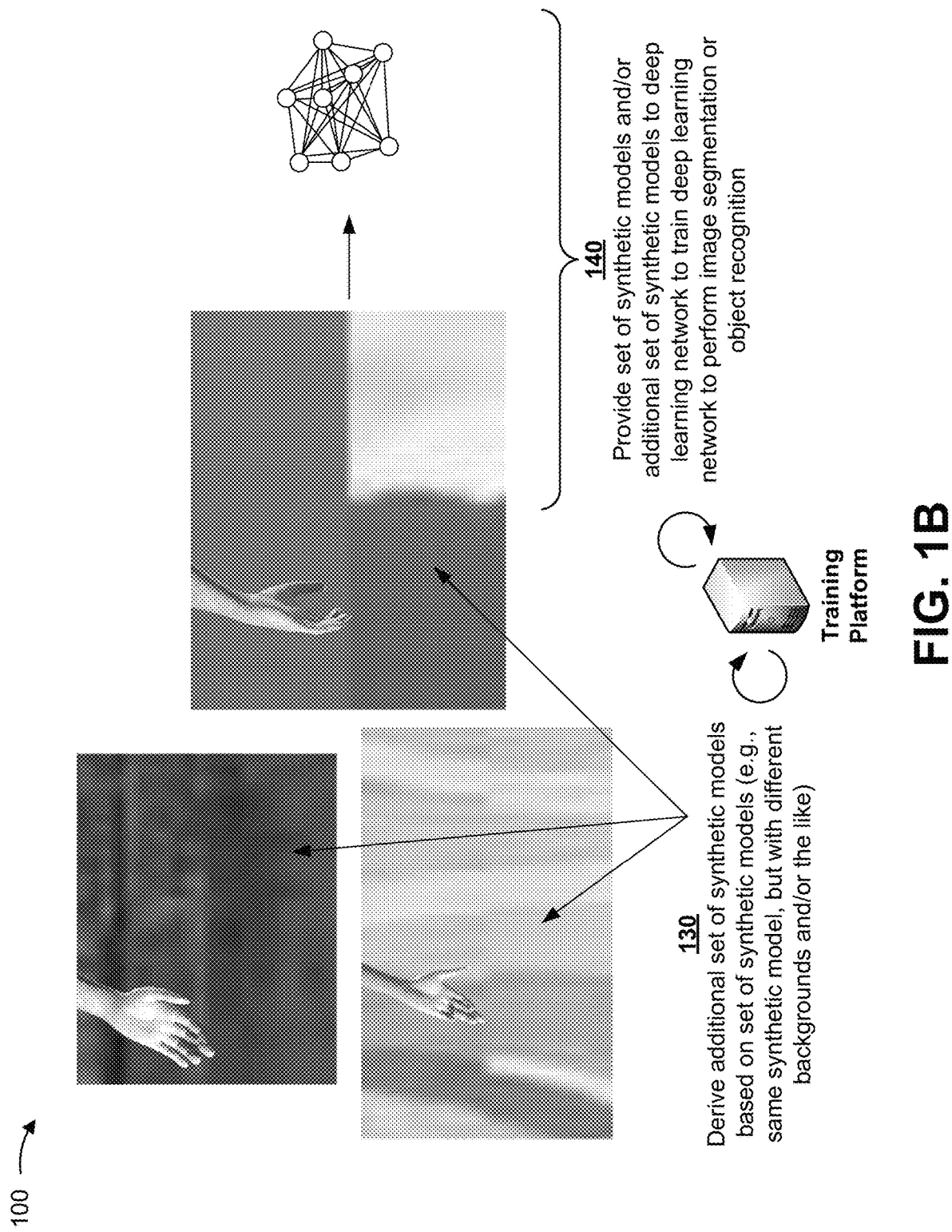

FIGS. 1A and 1B are diagrams of an example implementation 100 described herein. Example implementation 100 includes a training platform configured to generate synthetic models and use the synthetic models to train a machine learning model, such as a deep learning network, to perform image segmentation, object recognition, motion recognition, and/or the like.

As shown in FIG. 1A, and as shown by reference number 110, the training platform may receive data for generating synthetic models of a body part. In some implementations, the body part may include a body part of an animal, such as a human. For example, the body part may include a human hand (e.g., a left hand or a right hand), a human arm, a human foot, a human leg, and/or the like. In some implementations, a synthetic model may include a three-dimensional (3D) model. Alternatively, in some implementations, a synthetic model may include a two-dimensional (2D) model. In some cases, a synthetic model may be referred to as a virtual object, and may include an image of the body part. Additionally, or alternatively, the synthetic model may include a data structure that stores parameters used to generate the virtual object (e.g., the image).

In some implementations, a synthetic model may include components that correspond to various portions of the body part. For example, in a case where the body part includes a hand, a synthetic model may include a first component corresponding to a first finger (e.g., a thumb) of the hand, a second component corresponding to a second finger (e.g., an index finger) of the hand, a third component corresponding to a third finger (e.g., a middle finger) of the hand, a fourth component corresponding to a fourth finger (e.g., a ring finger) of the hand, a fifth component corresponding to a fifth finger (e.g., a pinky) of the hand, a sixth component corresponding to a palm of the hand, a seventh component corresponding to a wrist that connects the hand to an arm, and/or the like.

In some implementations, the data may include information that relates to various potential poses of the body part. For example, the data may include information relating to various potential poses of the hand. In some implementations, the information may identify potential positions that each component of a synthetic model may occupy or assume. For example, the information may identify a potential position that the first component (e.g., corresponding to a thumb) may occupy or assume in the synthetic model, a potential position that the second component (e.g., corresponding to an index finger) may occupy or assume in the synthetic model, and so on. In some implementations, the potential positions that a given component of a synthetic model may occupy or assume may be different from the potential positions that another component of the synthetic model may occupy or assume.

In some implementations, the information may identify ranges of permissible angular positions, or angles, relating to joints associated with each component of a synthetic model (e.g., angles relative to an axis along a portion of a length of a component corresponding to a finger, relative to an axis along a surface of a component corresponding to a palm, and/or the like). For example, each component, of a synthetic model of a hand, may include joints that correspond to joints of individual fingers of the hand, a wrist of the hand, and/or the like. In such cases, the information may identify ranges of permissible angular positions relating to the joints of such components—e.g., such that components corresponding to fingers do not bend too far backward and/or the like. For example, in an Euler angle space definition, the range for a joint angle could be from ($\alpha=25$, $\beta=-12$, $\gamma=45$) to ($\alpha=75$, $\beta=28$, $\gamma=45$), which denotes this particular joint can only rotate within a plane represented by $\gamma=45$, and only $\alpha$ and $\beta$ can take values within the specified bounds of $\gamma$.

In some implementations, the information may identify permissible relative positions between any two or more components of a synthetic model. For example, the information may identify a range of permissible distances (e.g., in 3D space) between the first component of a synthetic model and the second component of the synthetic model, a range of permissible distances between the second component and a third component of the synthetic model, and/or the like. For example, the length of a specific finger bone (e.g., a proximal phalanx) can range from 2 centimeters to 3.3 centimeters.

In some implementations, the information may identify a range of permissible sizes (e.g., absolute sizes, relative sizes, and/or the like) of each component of the one or more components (e.g., permissible volumes which each component may occupy in 3D space—e.g., a component, corresponding to a pinky of a hand, being permitted to have a certain length, a certain width, a certain depth, and/or the like). For example, the information may identify a range of permissible sizes of a first component of a synthetic model, another range of permissible sizes of a second component of the synthetic model, and/or the like. For example, the width of a specific finger bone (e.g., a proximal phalanx) can range from 0.4 centimeters to 1.2 centimeters.

Additionally, or alternatively, in some implementations, the information may identify impermissible values, such as impermissible relative positions, ranges of impermissible sizes (e.g., absolute sizes, relative sizes, and/or the like), ranges of impermissible angular positions, and/or the like, rather than permissible values. In any case, identifying information, as described above, may constrain synthetic model generation such that generated synthetic models appear realistic and/or adhere, or conform, to natural limits associated with an anatomy of a human hand.

As shown by reference number 120, the training platform may generate a set of synthetic models of the body part based on the data. In some implementations, the training platform may generate hundreds, thousands, millions, etc., of synthetic models in a manner which cannot be performed manually or objectively by a human actor.

In some implementations, the training platform may generate the set of synthetic models randomly, pseudo-randomly, based on user input, and/or the like. For example, in some implementations, the training platform may, based on the information identifying the permissible angular positions, the permissible relative positions, and/or the range of permissible sizes, randomly generate a set of synthetic models, such that the synthetic models (e.g., all the synthetic models) in the set of synthetic models are different from one another (e.g., some or all of the first components of all the synthetic models are in different positions, bend at corresponding joints at different angles, and/or the like), but do not violate the permissible angular positions, relative positions, and/or sizes. In this way, the training platform may generate multiple synthetic models that represent a variety of poses of the body part.

In some implementations, the training platform may generate a synthetic model such that no portion of any two components of the synthetic model overlap one another—e.g., such that a portion of one component of the synthetic model (e.g., a first component corresponding to a thumb) and a portion of another component of the synthetic model (e.g., a second component corresponding to an index finger) do not occupy a common voxel in 3D space. This may similarly constrain synthetic model generation such that generated synthetic models appear realistic and/or adhere, or conform, to the overall anatomy of a human hand.

In various implementations, the training platform may include one or more modeling applications (e.g., 3D modeling applications) configured to generate the synthetic models. In some implementations, the modeling application(s) may define 3D model geometries using various 3D shapes, such as cones, cubes, cylinders, spheres, etc. and/or 2D shapes. In some implementations, the modeling application(s) may apply various features to 3D model geometries, such as features relating to colors, textures, and/or the like, so as to create synthetic models that are realistic (e.g., that closely resemble a real hand). In some implementations, the modeling application(s) may define the synthetic models such that the synthetic models are interactive (e.g., rotatable, scalable, and/or the like).

As shown in FIG. 1B, and as shown by reference number 130, the training platform may derive an additional set of synthetic models based on the set of synthetic models. In some implementations, the training platform may process one or more synthetic models in the set of synthetic models to derive the additional set of synthetic models.

For example, the training platform may derive a copy of a synthetic model, and modify a background associated with the copy of the synthetic model (e.g., by changing a color of the background, a pattern of the background, adding or removing noise to the background, and/or the like) so that the deep learning network is trained on a portion of the image that includes the body part rather than a portion of the image that includes the background. Additionally, or alternatively, the training platform may modify one or more parameters (e.g., positions, angles, color, texture, and/or the like) relating to one or more components of the copy of the synthetic model to arrive at a modified synthetic model. In some implementations, the training platform may adjust a field of view of a virtual camera associated with a synthetic model to arrive at one or more additional synthetic models (e.g., that exhibit alternative views of the original synthetic model, from different perspectives). In any case, generating additional synthetic models may result in a diverse array of synthetic models (e.g., representing a wide variety of poses of the body part in a wide variety of fields of view) that may be used to train the deep learning network.

As shown by reference number 140, the training platform may provide the set of synthetic models and/or the additional set of synthetic models to the deep learning network to train the deep learning network to perform image segmentation, object recognition, or motion recognition. Image segmentation is a process for assigning values to each pixel of an image to indicate which object each pixel represents. For example, performing segmentation on an image (e.g., an image, of an actual hand of a user) may involve assigning values of "target object" and, perhaps, "not target object," or "hand" and "not hand." In some implementations, the target object may include a body part, such as a hand, an arm, a leg, a foot, and/or the like. However, implementations described herein may be applied to any target object.

In some implementations, training a deep learning network (e.g., an image segmentation network) may requires a large dataset of "pairs" of images. The first image in the pair may be the generated image of the body part (e.g., the hand) on whatever background that was selected and/or generated for that image. The second image in the pair may be a label image that specifies target label values for each pixel. In a simple segmentation model, the label image is a black and white image, where each pixel that is part of the hand is a white pixel, and any pixel that is not part of the hand is black. In another implementation, the label image could include more information. For example, all pixels that are part of the phalanx index may be colored with a first color (e.g., blue), all pixels that are part of the palm may be colored with a second color (e.g., red), and/or the like. Using this mechanism, the deep learning network can be trained to not only identify a hand, but also the subcomponents of a hand, such as individual fingers.

In this way, a target object may be detected or recognized in an image (e.g., the contours or boundaries of the object, whether the image contains the object, and/or the like). Additionally, or alternatively, by analyzing a sequence of images, motion recognition may be performed, which may refer to detecting a sequence of poses, positions, and/or the like, of a target object, to determine whether the target object is moving in a particular way (e.g., that matches a predefined pattern).

In some implementations, the training platform may provide the set of synthetic models (e.g., one or more synthetic models in the set of synthetic models), images (e.g., 2D images and/or 3D images) of one or more synthetic models in the set of synthetic models, the additional set of synthetic models (e.g., one or more synthetic models in the additional set of synthetic models), and/or images (e.g., 2D images and/or 3D images) of one or more synthetic models in the additional set of synthetic models, to the deep learning network, which the deep learning network may utilize to learn to perform image segmentation, object recognition, or motion recognition.

For example, in a case where the body part includes a hand, the deep learning network may, based on pixel and/or voxel information of the set of synthetic models, the set of additional synthetic models, and/or associated images of the set of synthetic models and/or the additional set of synthetic models (e.g., pixel and/or voxel information corresponding to relative finger-to-finger positions, angles at which fingers bend relative to one another and/or relative to a palm, angles at which a wrist may bend, and/or the like), learn how to recognize a hand in a target image.

In this way, the training platform generates high-quality synthetic models that are realistic. This reduces or eliminates a need to capture actual images of human hands and/or curate the images to label the human hands, which is an otherwise time-consuming and error-prone process. Generating synthetic models, with precise labels of what features a deep learning network is to learn to identify, and utilizing such synthetic models to train a deep learning network, as described herein, improves the overall learning process of the deep learning network, which conserves processing resources and memory resources that would otherwise need to be expended, for example, by the deep learning network to process inaccurate training data. Further, the deep learning network can be used to perform segmentation of images in a variety of fields involving human hands, such as in medical diagnoses (e.g., to determine whether a patient has a hand-related medical condition and/or the like), hand-based robotics (e.g., where precise detection and monitoring of a hand may be translated into robotic motion), and/or the like.

As indicated above, FIGS. 1A and 1B are provided merely as examples. Other examples may differ from what is described with regard to FIGS. 1A and 1B.

Figure 2:
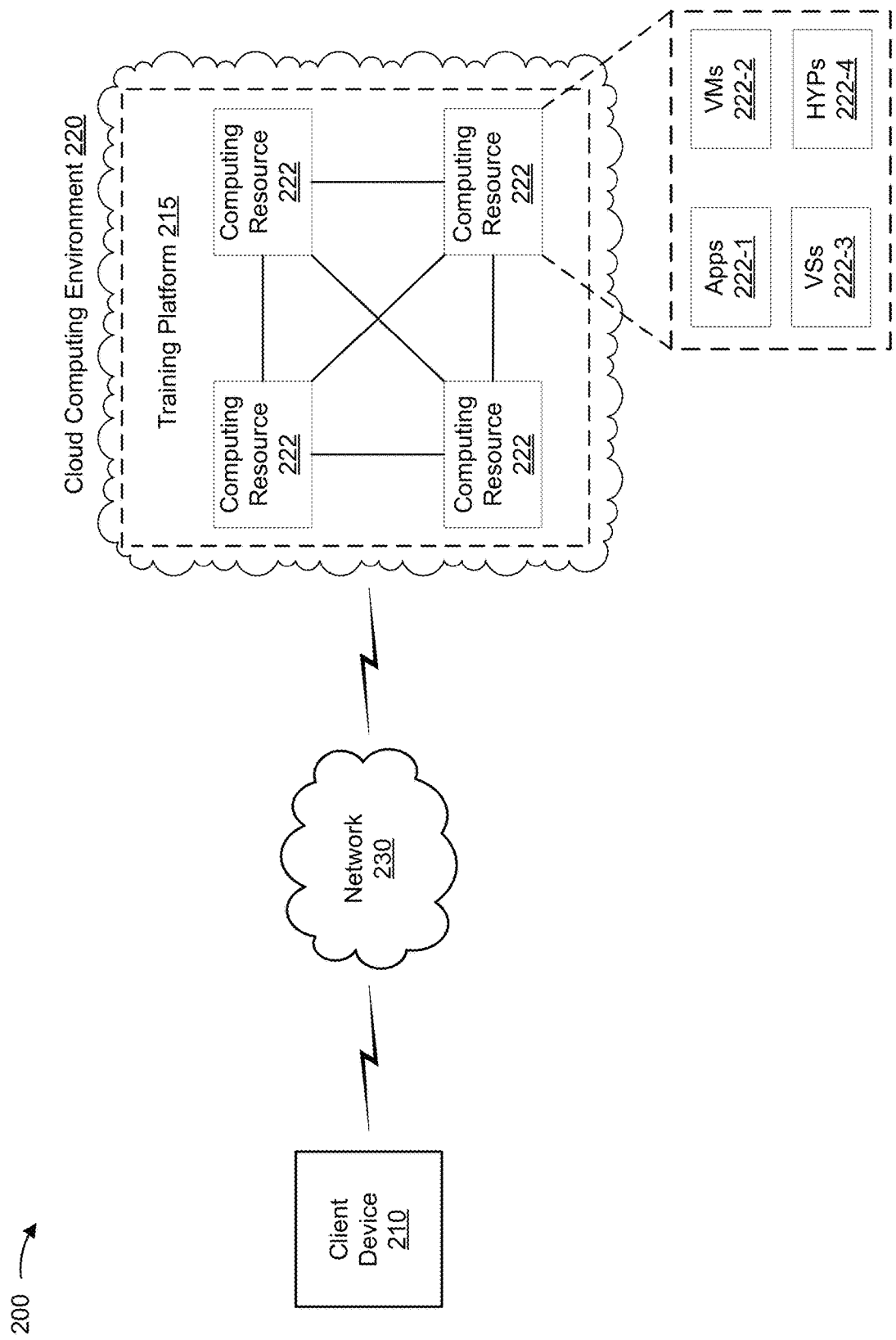
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a training platform 215, and a network 230. Devices of environment 200 may interconnect via wired connections, wireless connections, or a combination of wired and wireless connections.

Client device 210 includes one or more devices capable of receiving, generating, storing, processing, and/or providing data. For example, client device 210 may include a communication and/or computing device, such as a mobile phone (e.g., a smart phone, a radiotelephone, etc.), a desktop computer, a laptop computer, a tablet computer, a handheld computer, a gaming device, a device integrated within a vehicle, a wearable communication device (e.g., a smart wristwatch, a pair of smart eyeglasses, etc.), or a similar type of device. In some implementations, client device 210 may exchange data (e.g., synthetic models and/or the like) with training platform 215.

Training platform 215 includes one or more devices capable of receiving, generating, storing, processing, and/or providing data associated with client device 210. In some implementations, training platform 215 may generate synthetic models of a body part, and cause the synthetic models to be provided to a deep learning network to train the deep learning network to perform image segmentation, object recognition, motion recognition, and/or the like, as described elsewhere herein.

Training platform 215 may include a server device or a group of server devices. In some implementations, as shown, training platform 215 can be hosted in a cloud computing environment 220. Notably, while implementations described herein describe training platform 215 as being hosted in cloud computing environment 220, in some implementations, training platform 215 is not cloud-based, or is partially cloud-based.

Cloud computing environment 220 includes an environment that delivers computing as a service, whereby shared resources, services, etc., can be provided to client device 210 and/or one or more other training platforms 215. Cloud computing environment 220 can provide computation, software, data access, storage, and/or other services that do not require end-user knowledge of a physical location and configuration of a system and/or a device that delivers the services. As shown, cloud computing environment 220 can include a set of computing resources 222.

Computing resource 222 includes one or more personal computers, workstation computers, server devices, or another type of computation and/or communication device. In some implementations, computing resource 222 can host training platform 215. In some implementations, cloud resources can include compute instances executing in computing resource 222, storage devices provided in computing resource 222, data transfer devices provided by computing resource 222, etc. In some implementations, computing resource 222 can communicate with other computing resources 222 via wired connections, wireless connections, or a combination of wired and wireless connections.

As further shown in FIG. 2, computing resource 222 can include a group of cloud resources, such as one or more applications ("APPs") 222-1, one or more virtual machines ("VMs") 222-2, virtualized storage ("VSs") 222-3, one or more hypervisors ("HYPs") 222-4, and/or the like.

Application 222-1 includes one or more software applications that can be provided to or accessed by client device 210. Application 222-1 can eliminate a need to install and execute the software applications on client device 210. For example, application 222-1 can include software associated with training platform 215 and/or any other software capable of being provided via cloud computing environment 220. In some implementations, one application 222-1 can send/receive information to/from one or more other applications 222-1, via virtual machine 222-2.

Virtual machine 222-2 includes a software implementation of a machine (e.g., a computer) that executes programs like a physical machine. Virtual machine 222-2 can be either a system virtual machine or a process virtual machine, depending upon use and degree of correspondence to any real machine by virtual machine 222-2. A system virtual machine can provide a complete system platform that supports execution of a complete operating system (OS). A process virtual machine can execute a single program, and can support a single process. In some implementations, virtual machine 222-2 can execute on behalf of a user (e.g., client device 210) and/or on behalf of one or more other training platforms 215, and can manage infrastructure of cloud computing environment 220, such as data management, synchronization, or long-duration data transfers.

Virtualized storage 222-3 includes one or more storage systems and/or one or more devices that use virtualization techniques within the storage systems or devices of computing resource 222. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 222-4 provides hardware virtualization techniques that allow multiple operating systems (e.g., "guest operating systems") to execute concurrently on a host computer, such as computing resource 222. Hypervisor 222-4 can present a virtual operating platform to the guest operating systems, and can manage the execution of the guest operating systems. Multiple instances of a variety of operating systems can share virtualized hardware resources.

Network 230 includes one or more wired and/or wireless networks. For example, network 230 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
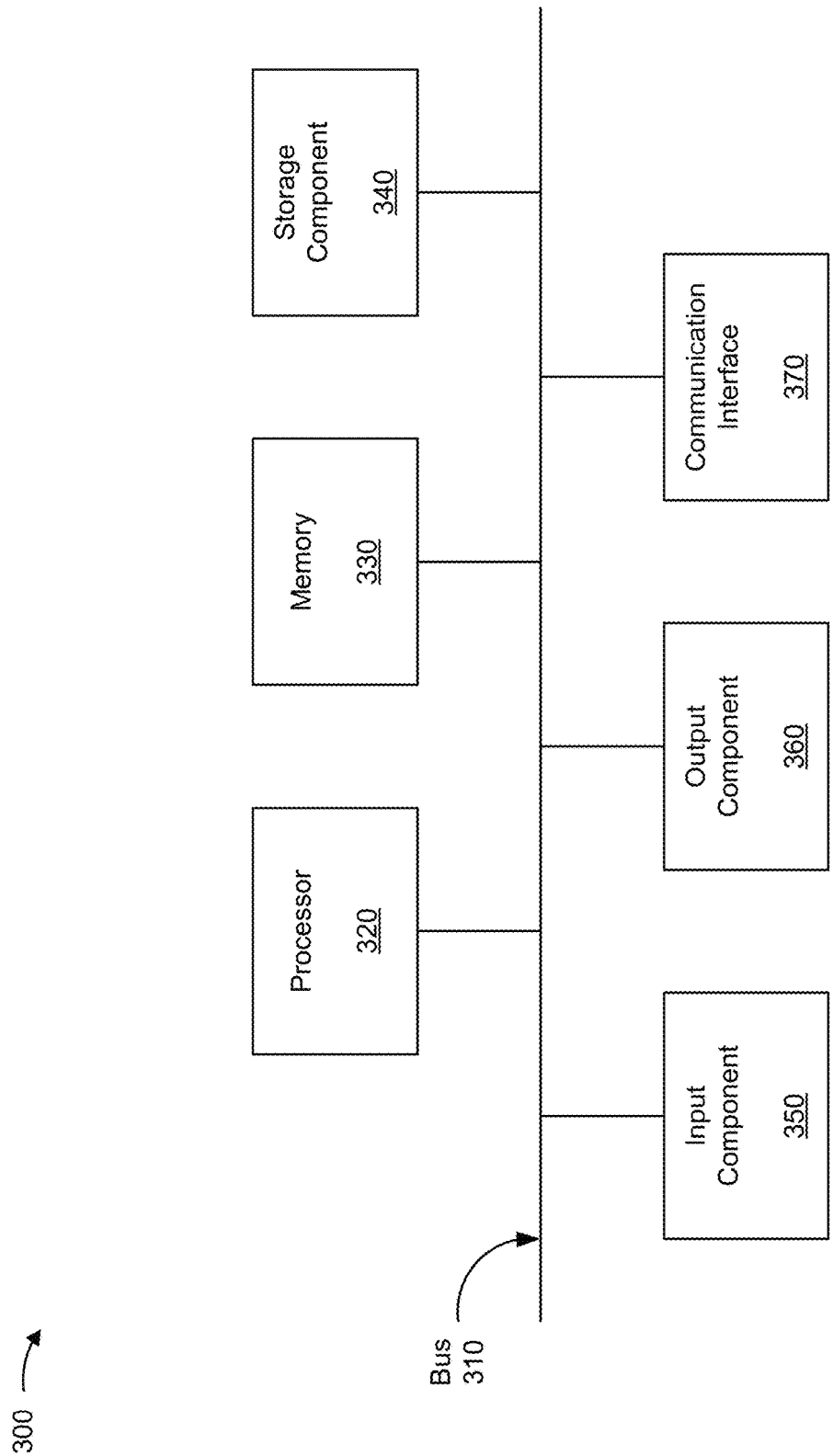
FIG. 3 is a diagram of example components of one or more devices of FIG. 2.

FIG. 3 is a diagram of example components of a device 300. Device 300 may correspond to client device 210 and/or training platform 215. In some implementations, client device 210 and/or training platform 215 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, an actuator, and/or image sensor(s) (e.g., camera(s))). Output component 360 includes a component that provides output information from device 300 (e.g., a display, a speaker, and/or one or more LEDs).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
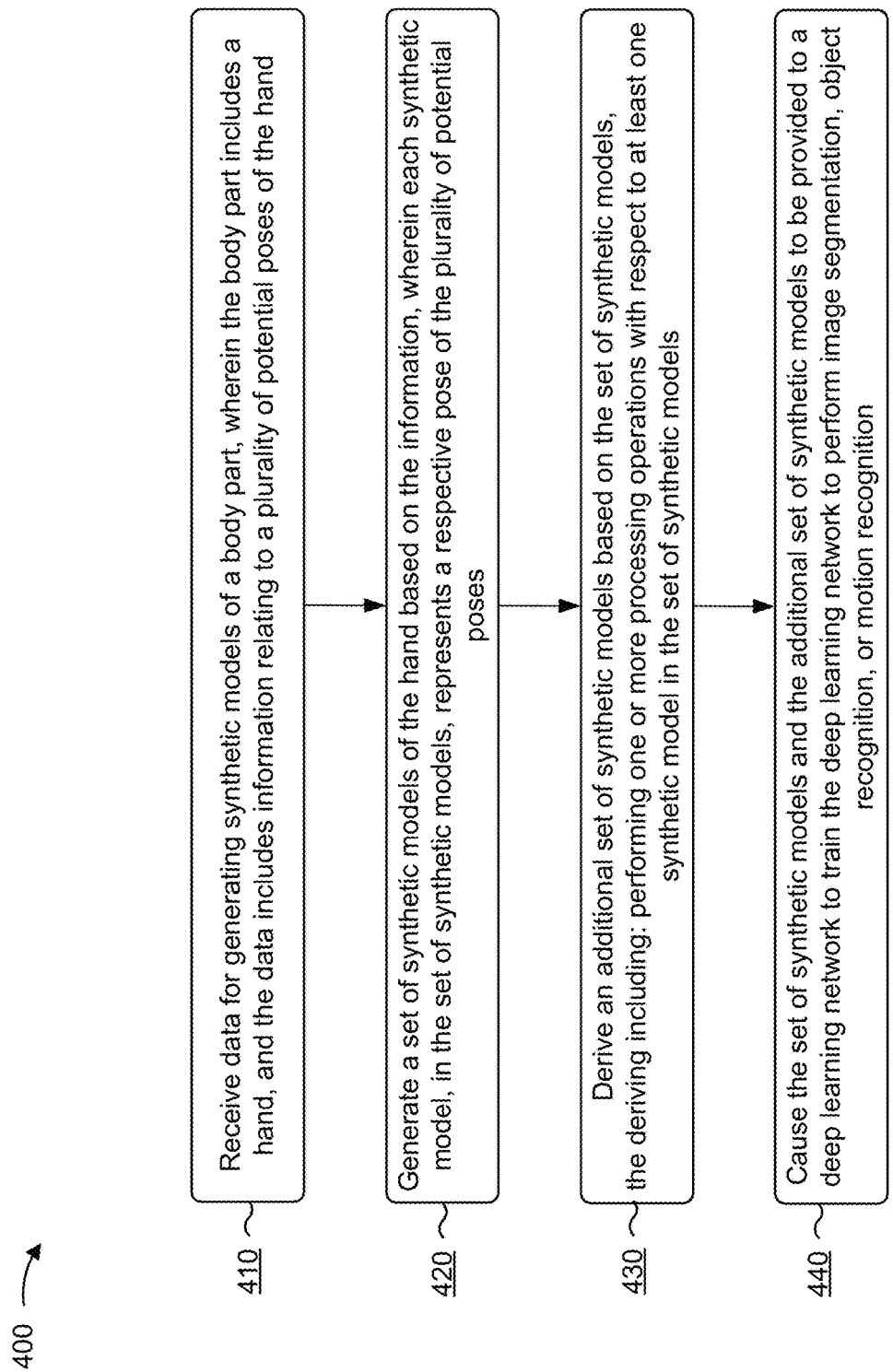
FIG. 4 is a flow chart of an example process for generating synthetic models for training a deep learning network.

FIG. 4 is a flow chart of an example process 400 for generating synthetic models for training a deep learning network. In some implementations, one or more process blocks of FIG. 4 may be performed by a training platform (e.g., training platform 215). In some implementations, one or more process blocks of FIG. 4 may be performed by another device or a group of devices separate from or including the training platform, such as client device 210.

As shown in FIG. 4, process 400 may include receiving data for generating synthetic models of a body part, the body part including a hand, and the data including information relating to a plurality of potential poses of the hand (block 410). For example, the training platform (e.g., using computing resource 222, processor 320, memory 330, storage component 340, input component 350, communication interface 370, and/or the like) may receive data for generating synthetic models of a body part, as described above in connection with FIGS. 1A and 1B. In some implementations, the body part includes a hand. In some implementations, the data includes information relating to a plurality of potential poses of the hand.

As further shown in FIG. 4, process 400 may include generating a set of synthetic models of the hand based on the information (block 420). For example, the training platform (e.g., using computing resource 222, processor 320, memory 330, storage component 340, input component 350, communication interface 370, and/or the like) may generate a set of synthetic models of the hand based on the information, as described above in connection with FIGS. 1A and 1B. In some implementations, each synthetic model, in the set of synthetic models, represents a respective pose of the plurality of potential poses.

As further shown in FIG. 4, process 400 may include deriving an additional set of synthetic models based on the set of synthetic models (block 430). For example, the training platform (e.g., using computing resource 222, processor 320, memory 330, storage component 340, input component 350, communication interface 370, and/or the like) may derive an additional set of synthetic models based on the set of synthetic models, as described above in connection with FIGS. 1A and 1B. In some implementations, the deriving is performed after generating the set of synthetic models. In some implementations, the deriving includes performing one or more processing operations with respect to at least one synthetic model in the set of synthetic models.

As further shown in FIG. 4, process 400 may include causing the set of synthetic models and the additional set of synthetic models to be provided to a deep learning network to train the deep learning network to perform image segmentation, object recognition, or motion recognition (block 440). For example, the training platform (e.g., using computing resource 222, processor 320, memory 330, storage component 340, input component 350, communication interface 370, and/or the like) may cause the set of synthetic models and the additional set of synthetic models to be provided to a deep learning network to train the deep learning network to perform image segmentation, object recognition, motion recognition, and/or the like, as described above in connection with FIGS. 1A and 1B.

Process 400 may include additional implementations, such as any single implementation or any combination of implementations described below and/or in connection with one or more other processes described elsewhere herein.

In some implementations, generating the set of synthetic models includes randomly generating the set of synthetic models based on the information. In some implementations, the information identifies positions that one or more components, of any synthetic model in the set of synthetic models, are permitted to assume. In some implementations, the one or more components include at least one of: a first component corresponding to a first finger of the hand, a second component corresponding to a second finger of the hand, a third component corresponding to a third finger of the hand, a fourth component corresponding to a fourth finger of the hand, a fifth component corresponding to a fifth finger of the hand, or a sixth component corresponding to a palm of the hand.

In some implementations, the positions, that any two components of the first component, the second component, the third component, the fourth component, the fifth component, or the sixth component are permitted to assume, are different. In some implementations, the information identifies ranges of permissible angular positions relating to one or more joints associated with the first component, the second component, the third component, the fourth component, the fifth component, or the sixth component. In some implementations, the information identifies permissible relative positions between any two components of the first component, the second component, the third component, the fourth component, the fifth component, or the sixth component. In some implementations, the data further includes additional information that identifies a range of permissible sizes of each component of the one or more components.

In some implementations, generating the set of synthetic models includes generating each synthetic model, in the set of synthetic models, such that no portions, of any two of the first component of the synthetic model, the second component of the synthetic model, the third component of the synthetic model, the fourth component of the synthetic model, the fifth component of the synthetic model, or the sixth component of the synthetic model, occupy a common voxel.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
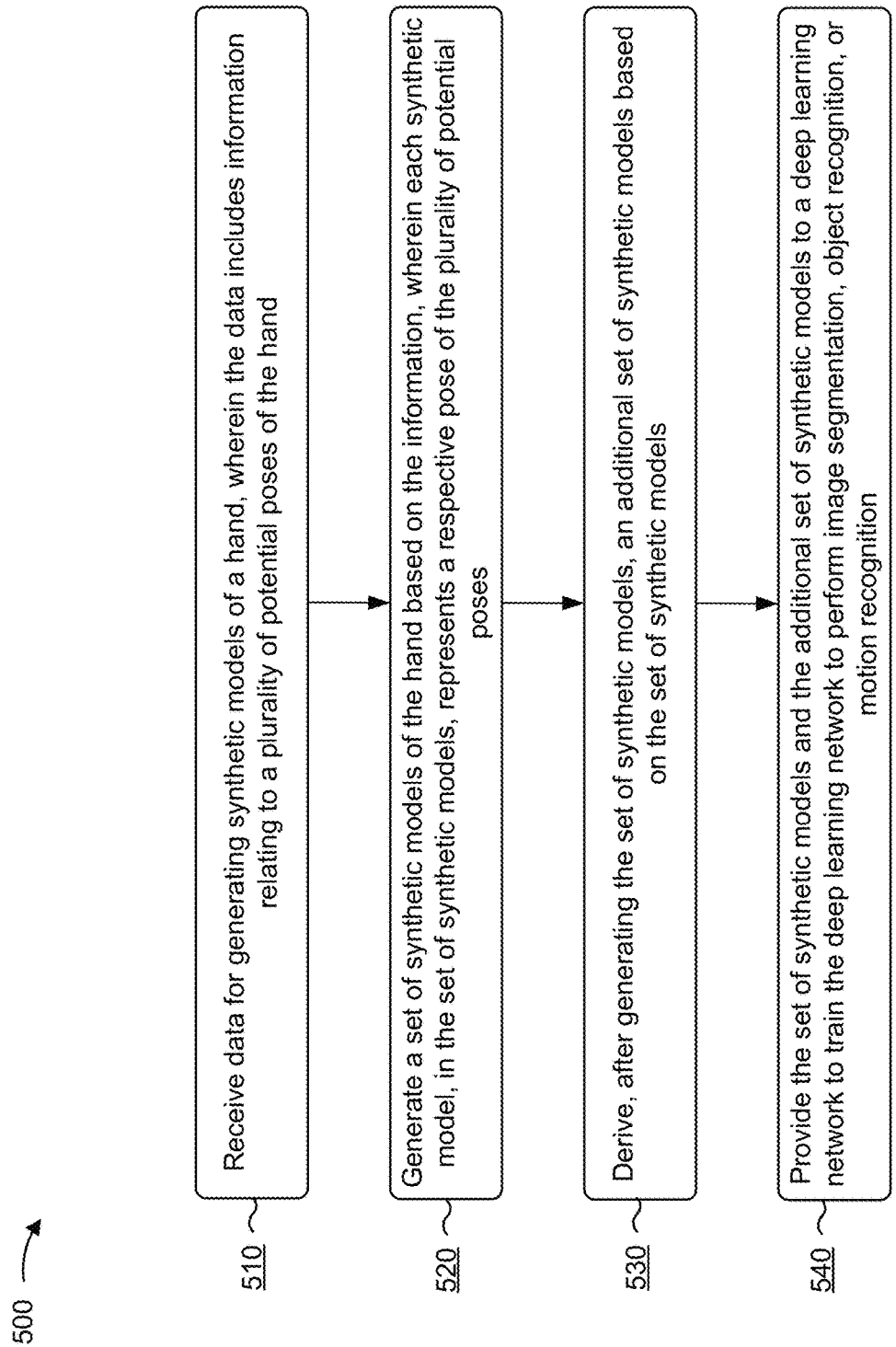
FIG. 5 is a flow chart of another example process for generating synthetic models for training a deep learning network.

FIG. 5 is a flow chart of an example process 500 for generating synthetic models for training a deep learning network. In some implementations, one or more process blocks of FIG. 5 may be performed by a training platform (e.g., training platform 215). In some implementations, one or more process blocks of FIG. 5 may be performed by another device or a group of devices separate from or including the training platform, such as client device 210.

As shown in FIG. 5, process 500 may include receiving data for generating synthetic models of a hand, wherein the data includes information relating to a plurality of potential poses of the hand (block 510). For example, the training platform (e.g., using computing resource 222, processor 320, memory 330, storage component 340, input component 350, communication interface 370, and/or the like) may receive data for generating synthetic models of a hand, as described above in connection with FIGS. 1A and 1B. In some implementations, the data includes information relating to a plurality of potential poses of the hand.

As further shown in FIG. 5, process 500 may include generating a set of synthetic models of the hand based on the information, wherein each synthetic model, in the set of synthetic models, represents a respective pose of the plurality of potential poses (block 520). For example, the training platform (e.g., using computing resource 222, processor 320, memory 330, storage component 340, input component 350, communication interface 370, and/or the like) may generate a set of synthetic models of the hand based on the information, as described above in connection with FIGS. 1A and 1B. In some implementations, each synthetic model, in the set of synthetic models, represents a respective pose of the plurality of potential poses.

As further shown in FIG. 5, process 500 may include deriving, after generating the set of synthetic models, an additional set of synthetic models based on the set of synthetic models (block 530). For example, the training platform (e.g., using computing resource 222, processor 320, memory 330, storage component 340, input component 350, communication interface 370, and/or the like) may derive an additional set of synthetic models based on the set of synthetic models, as described above in connection with FIGS. 1A and 1B. In some implementations, the additional set of synthetic models may be derived after generating the set of synthetic models. In some implementations, deriving the additional set of synthetic models includes determining one or more adjustments to one or more synthetic models in the set of synthetic models, and generating the additional set of synthetic models based on the one or more adjustments.

As further shown in FIG. 5, process 500 may include providing the set of synthetic models and the additional set of synthetic models to a deep learning network to train the deep learning network to perform image segmentation, object recognition, or motion recognition (block 540). For example, the training platform (e.g., using computing resource 222, processor 320, memory 330, storage component 340, input component 350, communication interface 370, and/or the like) may provide the set of synthetic models and the additional set of synthetic models to a deep learning network to train the deep learning network to perform image segmentation, object recognition, motion recognition, and/or the like, as described above in connection with FIGS. 1A and 1B.

Process 500 may include additional implementations, such as any single implementation or any combination of implementations described below and/or in connection with one or more other processes described elsewhere herein.

In some implementations, each synthetic model, in the set of synthetic models, is a three-dimensional model. In some implementations, the information identifies positions that one or more components, of any synthetic model in the set of synthetic models, are permitted to occupy. In some implementations, the one or more components include a set of components corresponding to different fingers of the hand, and/or an additional component corresponding to a wrist of the hand.

In some implementations, the information identifies restrictions on angles relating to one or more joints associated with the additional component and/or at least one component in the set of components. In some implementations, the plurality of potential poses is based on natural limits associated with an anatomy of a human hand. In some implementations, the hand includes a human hand.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
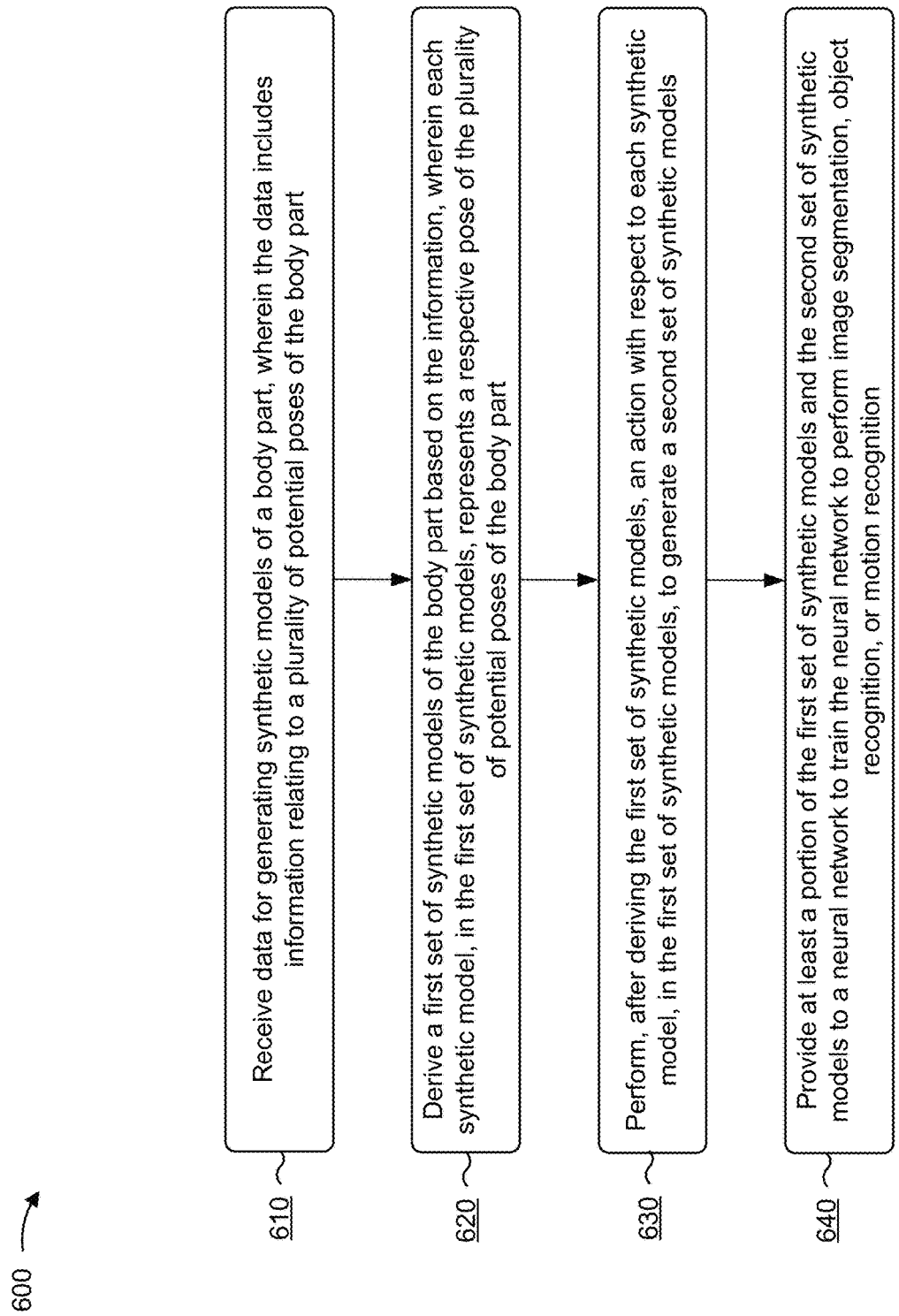
FIG. 6 is a flow chart of another example process for generating synthetic models for training a deep learning network.

FIG. 6 is a flow chart of an example process 600 for generating synthetic models for training a deep learning network. In some implementations, one or more process blocks of FIG. 6 may be performed by a training platform (e.g., training platform 215). In some implementations, one or more process blocks of FIG. 6 may be performed by another device or a group of devices separate from or including the training platform, such as client device 210.

As shown in FIG. 6, process 600 may include receiving data for generating synthetic models of a body part, wherein the data includes information relating to a plurality of potential poses of the body part (block 610). For example, the training platform (e.g., using computing resource 222, processor 320, memory 330, storage component 340, input component 350, communication interface 370, and/or the like) may receive data for generating synthetic models of a body part, as described above in connection with FIGS. 1A and 1B. In some implementations, the data includes information relating to a plurality of potential poses of the body part.

As further shown in FIG. 6, process 600 may include deriving a first set of synthetic models of the body part based on the information, wherein each synthetic model, in the first set of synthetic models, represents a respective pose of the plurality of potential poses of the body part (block 620). For example, the training platform (e.g., using computing resource 222, processor 320, memory 330, storage component 340, input component 350, communication interface 370, and/or the like) may derive a first set of synthetic models of the body part based on the information, as described above in connection with FIGS. 1A and 1B. In some implementations, each synthetic model, in the first set of synthetic models, represents a respective pose of the plurality of potential poses of the body part.

As further shown in FIG. 6, process 600 may include performing, after deriving the first set of synthetic models, an action with respect to each synthetic model, in the first set of synthetic models, to generate a second set of synthetic models (block 630). For example, the training platform (e.g., using computing resource 222, processor 320, memory 330, storage component 340, input component 350, communication interface 370, and/or the like) may perform an action with respect to each synthetic model, in the first set of synthetic models, to generate a second set of synthetic models, as described above in connection with FIGS. 1A and 1B. In some implementations, the action may be performed after deriving the first set of synthetic models.

As further shown in FIG. 6, process 600 may include providing at least a portion of the first set of synthetic models and the second set of synthetic models to a neural network to train the neural network to perform image segmentation, object recognition, or motion recognition (block 640). For example, the training platform (e.g., using computing resource 222, processor 320, memory 330, storage component 340, input component 350, communication interface 370, and/or the like) may provide at least a portion of the first set of synthetic models and the second set of synthetic models to a neural network to train the neural network to perform image segmentation, object recognition, motion recognition, and/or the like, as described above in connection with FIGS. 1A and 1B.

Process 600 may include additional implementations, such as any single implementation or any combination of implementations described below and/or in connection with one or more other processes described elsewhere herein.

In some implementations, the body part includes a left hand or a right hand. In some implementations, deriving the first set of synthetic models includes pseudo-randomly deriving the first set of synthetic models based on the information. In some implementations, performing the action includes altering a background associated with each synthetic model in the first set of synthetic models. In some implementations, performing the action includes adjusting a field of view of a virtual camera associated with each synthetic model in the first set of synthetic models. In some implementations, the information relates to positions that components of each synthetic model, in the first set of synthetic models, are permitted to assume.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method comprising:
   identifying, by one or more devices, data for generating a set of synthetic models of an object,
      wherein the data identifies:
         a first component corresponding to a first part of the object,
         a second component corresponding to a second part of the object, and
         a permissible relative distance between the first component and the second component;
   generating, by the one or more devices, the set of synthetic models based on the data; and
   causing, by the one or more devices, the set of synthetic models to be provided.

2. The method of claim 1, wherein a portion of the first component and a portion of the second component do not occupy a common voxel in a three-dimensional (3D) space.

3. The method of claim 1, wherein the object is a body part.

4. The method of claim 1, wherein the data further identifies:
   two or more other components that correspond to two or more other parts of the object.

5. The method of claim 1,
   wherein the data further identifies:
      a third component corresponding to a third part of the object, and
   wherein the third part is connected to the first part and the second part.

6. The method of claim 1, wherein a synthetic model, of the set of synthetic models, represents a pose of a plurality of potential poses of the object.

7. The method of claim 1,
   wherein the data further identifies:
      one or more first positions that the first component is permitted to assume, and
      one or more second positions that the second component is permitted to assume, and
   wherein the first positions are different from the second positions.

8. The method of claim 1, wherein causing the set of synthetic models to be provided comprises:
   causing the set of synthetic models to be provided to a deep learning network.

9. A system, comprising:
   one or more memories; and
   one or more processors, coupled to the one or more memories, configured to:
      identify data for generating a set of synthetic models of an object,
         wherein the data identifies:
            a first component corresponding to a first part of the object,
            a second component corresponding to a second part of the object, and
            a permissible distance between the first component and the second component;
      generate the set of synthetic models based on the data; and
      cause the set of synthetic models to be provided.

10. The system of claim 9, wherein a portion of the first component and a portion of the second component do not occupy a common voxel in a three-dimensional (3D) space.

11. The system of claim 9, wherein the data further identifies:
   two or more other components that correspond to two or more other parts of the object.

12. The system of claim 9,
   wherein the data further identifies:
      a third component corresponding to a third part of the object, and
   wherein the third part is connected to the first part and the second part.

13. The system of claim 9, wherein a synthetic model, of the set of synthetic models, represents a pose of a plurality of potential poses of the object.

14. The system of claim 9,
wherein the data further identifies:
first positions that the first component is permitted to assume, and
second positions that the second component is permitted to assume, and
wherein the first positions are different from the second positions.

15. The system of claim 9, wherein the one or more processors, when causing the set of synthetic models to be provided, are configured to:
cause the set of synthetic models to be provided to a deep learning network.

16. A non-transitory computer-readable medium storing a set of instructions, the set of instructions comprising:
one or more instructions that, when executed by one or more processors of one or more devices, cause the one or more devices to:
identify data for generating a set of synthetic models of an object,
wherein the data identifies a range of permissible distances between multiple components of the object;
generate the set of synthetic models based on the data; and
cause the set of synthetic models to be provided to a deep learning network.

17. The non-transitory computer-readable medium of claim 16,
wherein the data further identifies the multiple components, and
wherein the multiple components comprise:
a first component corresponding to a first part of the object, and
a second component corresponding to a second part of the object, and
wherein a portion of the first component and a portion of the second component do not occupy a common voxel in a three-dimensional (3D) space.

18. The non-transitory computer-readable medium of claim 16, wherein the object is a body part.

19. The non-transitory computer-readable medium of claim 16,
wherein the data further identifies the multiple components, and
wherein the multiple components comprise:
two or more components that correspond to two or more parts of the object.

20. The non-transitory computer-readable medium of claim 16,
wherein the data further identifies the multiple components, and
wherein the multiple components comprise:
a first component corresponding to a first part of the object,
a second component corresponding to a second part of the object, and
a third component corresponding to a third part of the object, and
wherein the third part is connected to the first part and the second part.

* * * * *